United States Patent

Madsack et al.

[11] Patent Number: 5,507,703
[45] Date of Patent: Apr. 16, 1996

[54] DIFFERENTIAL DRIVE

[75] Inventors: Heinz Madsack, Overath; Adrian Chludek, St. Augustin, both of Germany

[73] Assignee: GKN Viscodrive GmbH, Siegburg, Germany

[21] Appl. No.: 92,135

[22] Filed: Jul. 15, 1993

[30] Foreign Application Priority Data

Jul. 16, 1992 [DE] Germany ............ 42 23 374.7

[51] Int. Cl.$^6$ ............ F16H 48/10; F16H 57/04
[52] U.S. Cl. ............ 472/248; 475/334; 74/464; 74/468; 29/893.35; 29/898.02
[58] Field of Search ............ 74/443, 460, 462, 74/464, 468; 475/248, 334, 180; 29/893.3, 893.35, 898.02

[56] References Cited

U.S. PATENT DOCUMENTS

| | | | |
|---|---|---|---|
| 2,335,504 | 11/1943 | Gazda | 74/462 |
| 3,799,629 | 3/1974 | Laing | 29/898.02 X |
| 3,832,085 | 8/1974 | Defauw et al. | 415/119 |
| 4,086,022 | 4/1978 | Freeman et al. | 415/119 |
| 4,869,644 | 9/1989 | Takigawa | 415/119 X |
| 4,914,871 | 4/1990 | Fitzpatrick | 51/287 |
| 5,339,523 | 8/1994 | Hasegawa | 29/898.02 |

FOREIGN PATENT DOCUMENTS

| | | | |
|---|---|---|---|
| 32994 | 12/1980 | European Pat. Off. | |
| 1101102 | 3/1961 | Germany | 74/443 |
| 3906650 | 9/1990 | Germany | |
| 5141504 | 6/1993 | Japan | 74/468 |
| 706631 | 12/1979 | U.S.S.R. | 74/468 |
| 898191 | 1/1982 | U.S.S.R. | 74/468 |
| 1442772 | 12/1988 | U.S.S.R. | 74/443 |
| 1536108 | 1/1990 | U.S.S.R. | 74/468 |

Primary Examiner—Charles A. Marmor
Assistant Examiner—Nathan O. Jensen
Attorney, Agent, or Firm—Dinnin & Dunn

[57] ABSTRACT

A differential drive having a differential carrier rotatably supported in a differential housing is disclosed. Two axle shaft gears are rotatably held in cylindrical bores in the differential carrier and are arranged coaxially relative to one another. A plurality of differential gears are supported in an axis-less way in bores in the differential carrier and are arranged so as to be axis-parallel. One group of the differential gears engages the one of the axle shaft gears and the other group engages the other of the axle shaft gears. At least one of the group of the differential gears engages the respective other group of the differential gears. At least the tooth heads of the differential gears are provided with grooves, with at least the bores or pockets for the differential gears in the differential carrier being provided with grooves.

9 Claims, 3 Drawing Sheets

DIFFERENTIAL DRIVE

The invention relates to a differential drive having a differential carrier rotatably supported in a differential housing. Two axle shaft gears are rotatably held in cylindrical bores in the differential carrier and are arranged coaxially relative to one another. A plurality of differential gears are supported in an axis-less way in bores in the differential carrier and are arranged so as to be axis-parallel. One part of the differential gears engages one of the axle shaft gears and the other part of the differential gears engages the other of the axle shaft gears. Also, at least one part of the differential gears engages the respective other part of the differential gears.

Such differential drives, in the case of which the tooth heads of the differential gears are supported in housing bores, have a self-inhibiting effect which is due to the differential gears being subject to friction forces which, in turn, are caused by the tooth forces resulting at the differential gears and including a radial component.

If the differential gears are uniformly distributed across the circumference, the axle shaft gears are held so as to be substantially centered between the differential gears, so that an all-round circumferential play occurs at their tooth heads relative to their cylindrical bore, which means that the desired friction forces are generated entirely at the tooth heads of the differential gears if the friction conditions at the end faces are disregarded.

Furthermore, it has been proposed to distribute the differential gears unevenly across the circumference to be able to generate a worthwhile radial force as a result of the tooth forces acting on the axle shaft gears for the purpose of substantially increasing the locking effect of the differential drive as a result of the friction between the tooth heads of the axle shaft gears and their cylindrical bores in the differential carrier.

When operating such differential drives, it has been found that a noise of unknown origin developed under those operating conditions where the differential movement takes place, i.e. where the differential gears and the axle shaft gears rotate in their bores or pockets in the differential carrier.

SUMMARY OF THE INVENTION

It is an object of the present invention to provide means for eliminating such an operational behavior, i.e. the development of noise during differential movements.

A first solution provides at least the bores for the differential gears with grooves and optionally also the bores for the axle shaft gears.

Another solution provides at least the differential gears, and optionally also the axle shaft gears, with grooves. The effect of the grooves will be explained in greater detail below.

The grooves may be designed in several ways. If the differential gears have straight teeth and if the grooves extend in the axial direction, it is necessary for the pitch angle of the grooves to deviate from the pitch of the teeth. This condition does not apply in the case of helical teeth. Other possibilities include providing helically designed grooves which may intersect one another if they extend in different directions. It is advantageous for the width of the grooves to approximately correspond to the width of the tooth heads.

A further solution in accordance with the invention provides at least the surfaces of the bores for the differential gears with honing grooves or honing traces. As a result of the process applied in such a case, the grooves produced in this way are substantially helical and extend in opposite directions so that they intersect one another.

With applications where, due to suitable measures, friction occurs between the tooth heads of the axle shaft gears and their bores, in the case of differential movements in the differential drive, it is advantageous and effective, according to a further embodiment, to apply the characteristics of the invention also to the bores for the axle shaft gears and to the tooth heads of the axle shaft gears.

In accordance with all solutions mentioned, the grooves or honing traces in accordance with the invention resulted in improved lubrication conditions which, in turn, eliminated the noise without great loss of the self-inhibiting effect of the differential drive.

From the following detailed description taken in conjunction with the accompanying drawings and subjoined claims, other objects and advantages of the present invention will become apparent to those skilled in the art.

BRIEF DESCRIPTION OF THE DRAWINGS

A preferred embodiment of the invention is illustrated in the drawings wherein.

DETAILED DESCRIPTION OF THE PREFERRED EMBODIMENTS

Figure 1:
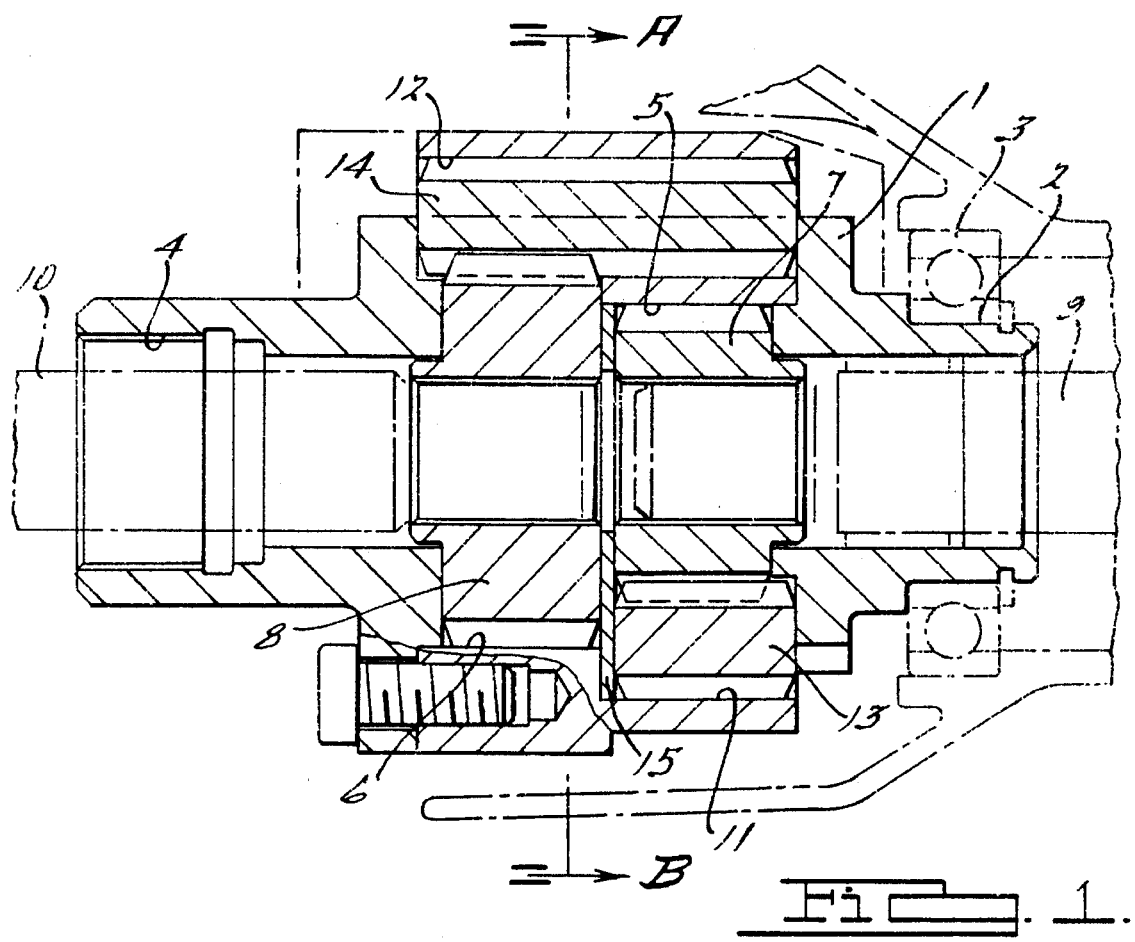
FIG. 1 is a longitudinal sectional view of a differential drive in accordance with the invention.

FIG. 1 shows a differential carrier 1 having a bearing seat 2 holding a rolling-contact bearing 3 which serves to rotatably support the differential carrier 1 in a differential drive housing (not illustrated). The second bearing will be referred to later.

At the opposite axial end of the bearing 3, the differential carrier 1 is provided with inner teeth 4 which may be engaged by a driving tubular shaft. The second set of supporting means may be provided indirectly via the driveshaft, e.g., a bearing supported by a bearing seat provided on the drive shaft (not illustrated).

Figure 2:
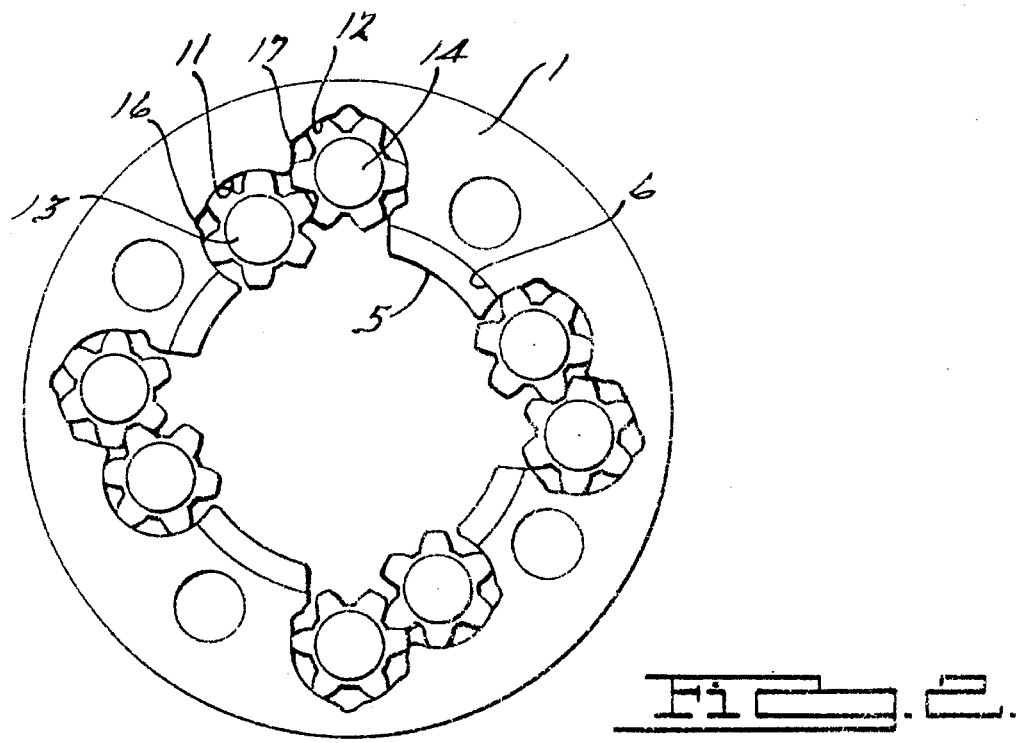
FIG. 2 is a cross-sectional view of FIG. 1 through line 2—2 thereof, but excluding the axle shaft gears.

The differential carrier includes two coaxial bores or pockets 5, 6 of different diameters which rotatably support two coaxially arranged axle shaft gears 7, 8 with radial play. The axle shaft gears 7, 8 are non-rotatingly connected to axle shaft 9, 10 which are illustrated in dashed lines only and which emerge from the differential carrier. Between the axle shaft gears 7, 8 a stop plate 15 is inserted into the differential carrier. The differential carrier further contains two groups of bores 11, 12 which penetrate one another at least in pairs. The bores are positioned on different pitch circles as seen in FIG. 2. The bores support differential gears 13, 14 which slide on their tooth heads. The bores or pockets 11, 12 penetrate the bores 5, 6 so that the group of differential gears 13 engages the axle shaft gear 7 and the group of differential gears 14 engages the axle shaft gear 8. The differential gears 13, 14 have different axial lengths. If viewed axially, the mutual engagement of the teeth of the differential gears 13, 14 takes place in the region of the smaller axle shaft gear 7.

In FIG. 2, the differential gears 13, 14 are uniformly circumferentially distributed, with four pairs of differential gears being provided in the present case.

In accordance with the invention, the bores 11 positioned on the smaller pitch circle each comprise one longitudinal groove 16 and the bores 12 positioned on the larger pitch circle each comprise three longitudinal grooves 17. The latter includes different circumferentially distributed pitch angles.

Figure 3A:
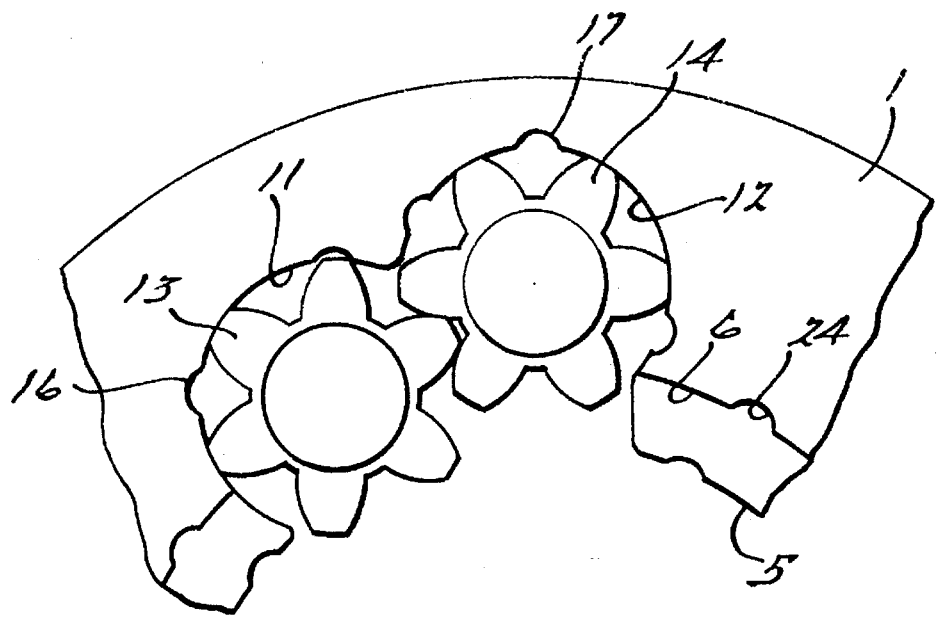
FIG. 3A is an enlarged detail according to FIG. 2.
Figure 3B:
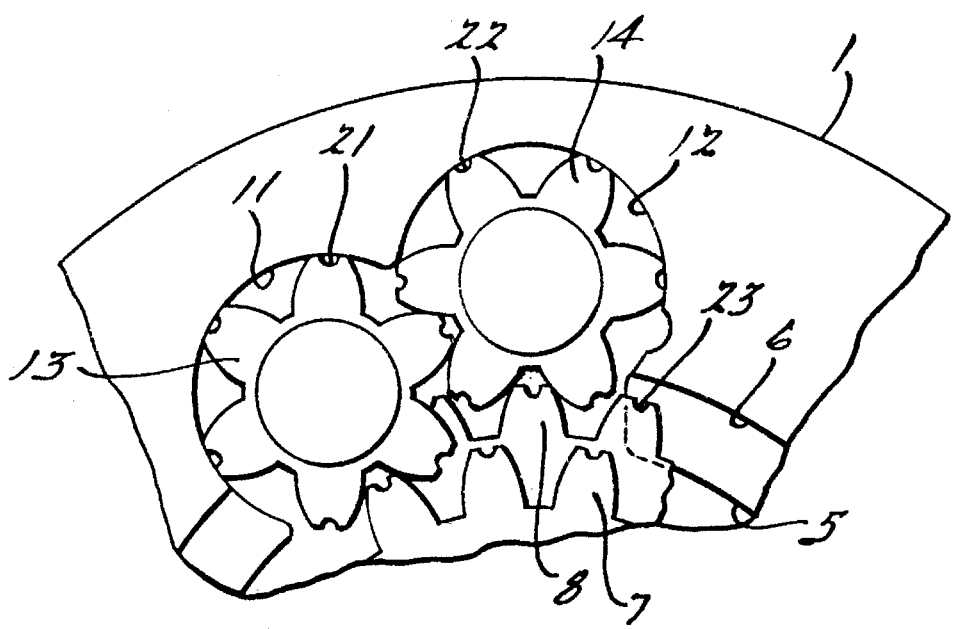
FIG. 3B is an enlarged detail according to FIG. 2.

FIG. 3A shows a pair of differential gears 13, 14 positioned in their pockets 11, 12. The longitudinal grooves 16, 17 are again illustrated. In their cross-section they are limited in a circular-arch-shaped way, with their base width approximately corresponding to the width of the tooth heads of the differential gears 13, 14. FIG. 3B illustrates the grooves 21, 22 in the differential gears 13, 14, respectively, as well as the grooves 23, 24 in the axle shaft gear 8 and the bore 6, respectively. Note that the other axle shaft gear 7 and bore 5 would likewise include grooves.

Figure 4:
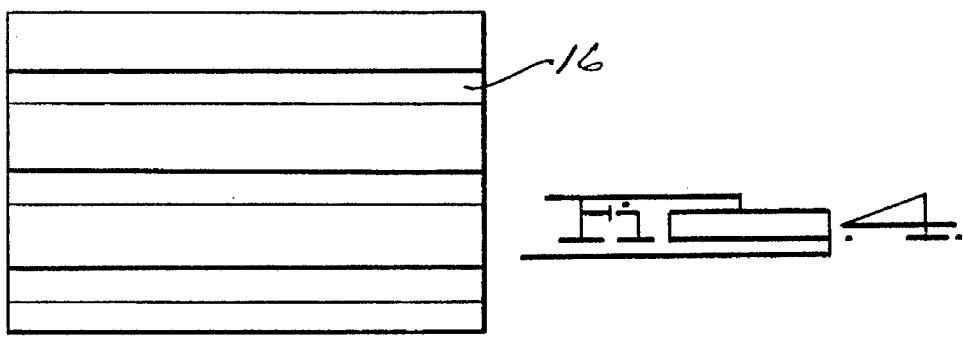
FIG. 4 is an enlarged detail according to FIG. 1.
Figure 5:
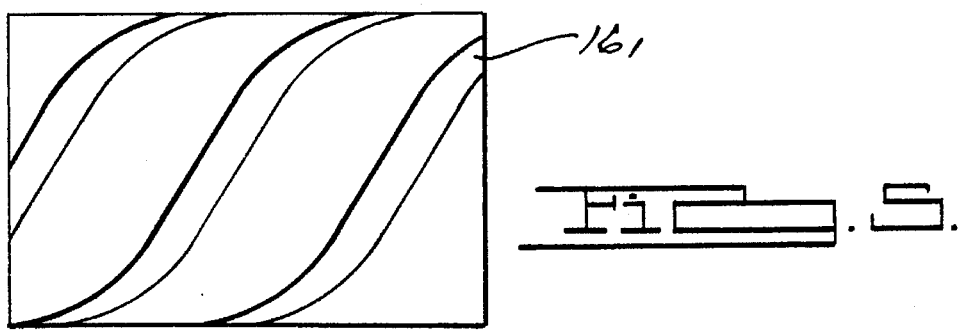
FIG. 5 is an enlarged detail according to FIG. 1.
Figure 6:
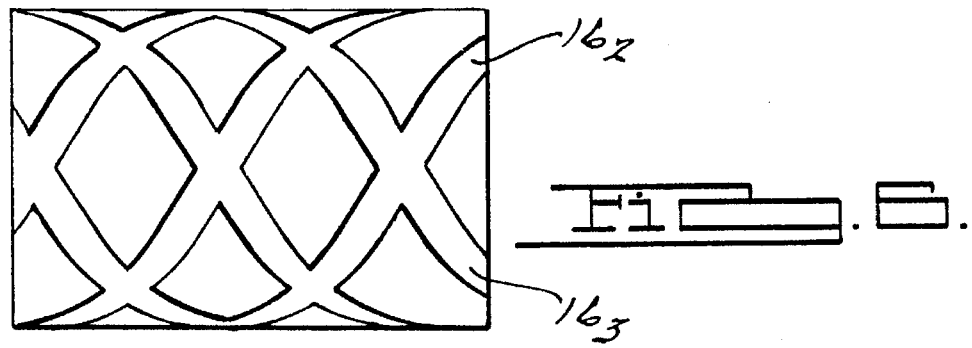
FIG. 6 is an enlarged detail according to FIG. 1.

FIGS. 4, 5 and 6 illustrate plan views of the grooves within the bores and on the tooth head, respectively. The figures illustrate helical axis parallel grooves and crossing helical grooves in plan with respect to the bore or gear axis.

Figure 7:
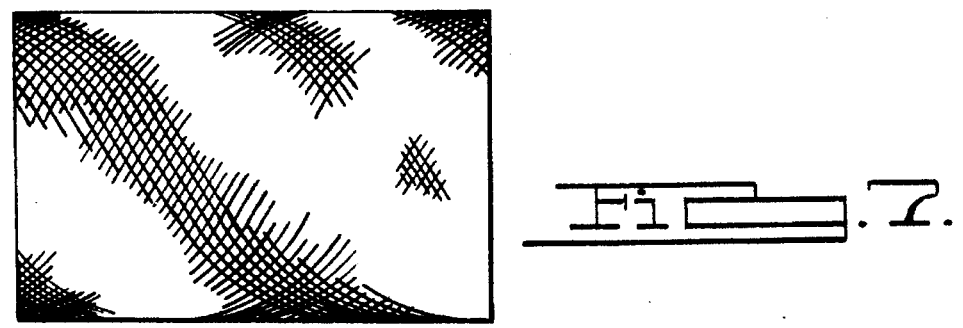
FIG. 7 is an enlarged detail according to FIG. 1.

FIG. 7 illustrates a plan view of the honing traces within a bore with respect to a bore axis.

While the above detailed description describes the preferred embodiment of the present invention, the invention is susceptible to modification, variation, and alteration without deviating from the scope and fair meaning of the subjoined claims.

What is claimed is:

1. A differential drive comprising:
   a differential carrier rotatably supported in a differential housing;
   two axle shaft gears forming sun gears rotatably held in cylindrical bores in the differential carrier and arranged coaxially relative to one another;
   a plurality of groups of differential gears supported in an axis-less way in bores or pockets in the differential carrier and arranged so as to be axis-parallel, with the tooth heads of the differential gears being in direct supported contact with the surfaces of the bores or pockets;
   one group of the differential gears engaging one of the axle shaft gears and the other group engaging the other of the axle shaft gears and each one of the differential gears of one group engaging at least one of the differential gears of the other group; and
   grooves are provided in at least the bores or pockets for the differential gears in the differential carrier.

2. A differential drive according to claim 1, wherein the grooves extend in an axis-parallel way.

3. A differential drive according to claim 1, wherein the grooves extend helically.

4. A differential drive according to claim 3, wherein different helical grooves are oriented in opposite directions and intersect one another.

5. A differential drive according to claim 1, wherein the surfaces of the bores for the axle shaft gears include grooves configured substantially the same as the grooves in the bores for the differential gears.

6. A differential drive comprising:
   a differential carrier rotatably supported in a differential housing;
   two axle shaft gears rotatably held in cylindrical bores in the differential carrier and arranged coaxially relative to one another;
   a plurality of groups of differential gears supported in an axis-less way in bores or pockets in the differential carrier and arranged to as to be axis-parallel, one group of the differential gears engaging one of the axle shaft gears and the other group engaging the other of the axle shaft gears and each one of the differential gears of one group engaging the at least one of the differential gears of the other group;
   helically extending grooves provided in at least the tooth heads of the differential gears;
   wherein different helical grooves are oriented in opposite directions and intersect one another.

7. A differential drive comprising:
   a differential carrier rotatably supported in a differential housing;
   two axle shaft gears rotatably held in cylindrical bores in the differential carrier and arranged coaxially relative to one another;
   a plurality of groups of differential gears supported in an axis-less way in bores or pockets in the differential carrier and arranged to as to be axis-parallel, one group of the differential gears engaging one of the axle shaft gears and the other group engaging the other of the axle shaft gears and each one of the differential gears of one group engaging the at least one of the differential gears of the other group;
   grooves provided in at least the tooth heads of the differential gears;
   wherein the surfaces of the bores for the axle shaft gears include grooves configured substantially the same as the grooves in the tooth heads of the differential gears.

8. A differential drive comprising:
   a differential carrier rotatably supported in a differential housing;
   two axle shaft gears rotatably held in cylindrical bores in the differential carrier and arranged coaxially relative to one another;
   a plurality of groups of differential gears supported in an axis-less way in bores or pockets in the differential carrier and arranged so as to be axis-parallel, one group of the differential gears engaging one of the axle shaft gears and the other group engaging the other of the axle shaft gears and each one of the differential gears of one group engaging at least one of the differential gears of the other group; and
   honing traces provided in at least the bores or pockets for the differential gears.

9. A differential drive according to claim 8, wherein the surfaces of the bores for the axle shaft gears include honing traces configured substantially the same as the honing traces in the bores for the differential gears.

* * * * *